June 18, 1935.  A. W. TONDREAU  2,005,014
FOCUSING DEVICE FOR A MOTION PICTURE CAMERA
Filed April 19, 1932   7 Sheets-Sheet 1
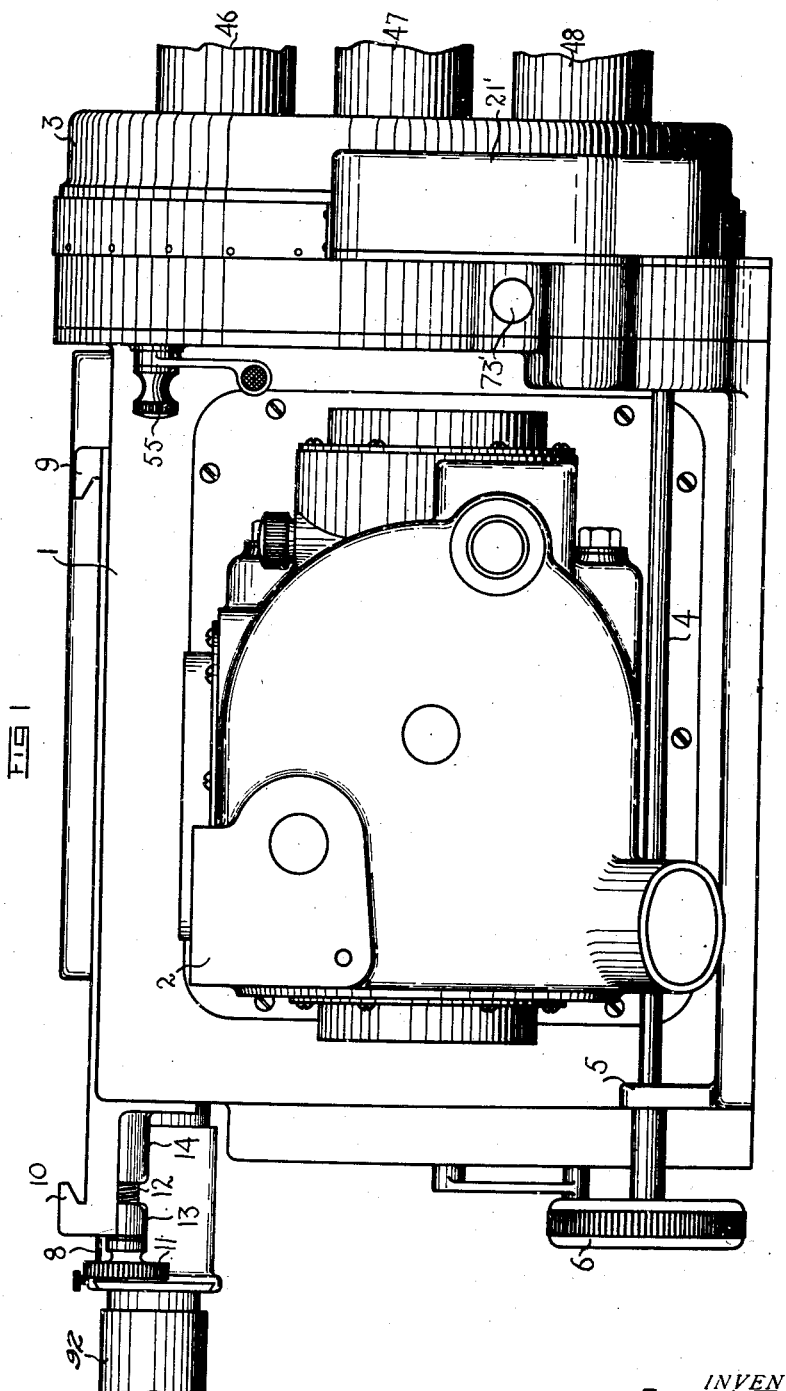
INVENTOR:
ALBERT W. TONDREAU.
BY W. E. Beatty
ATTORNEY.

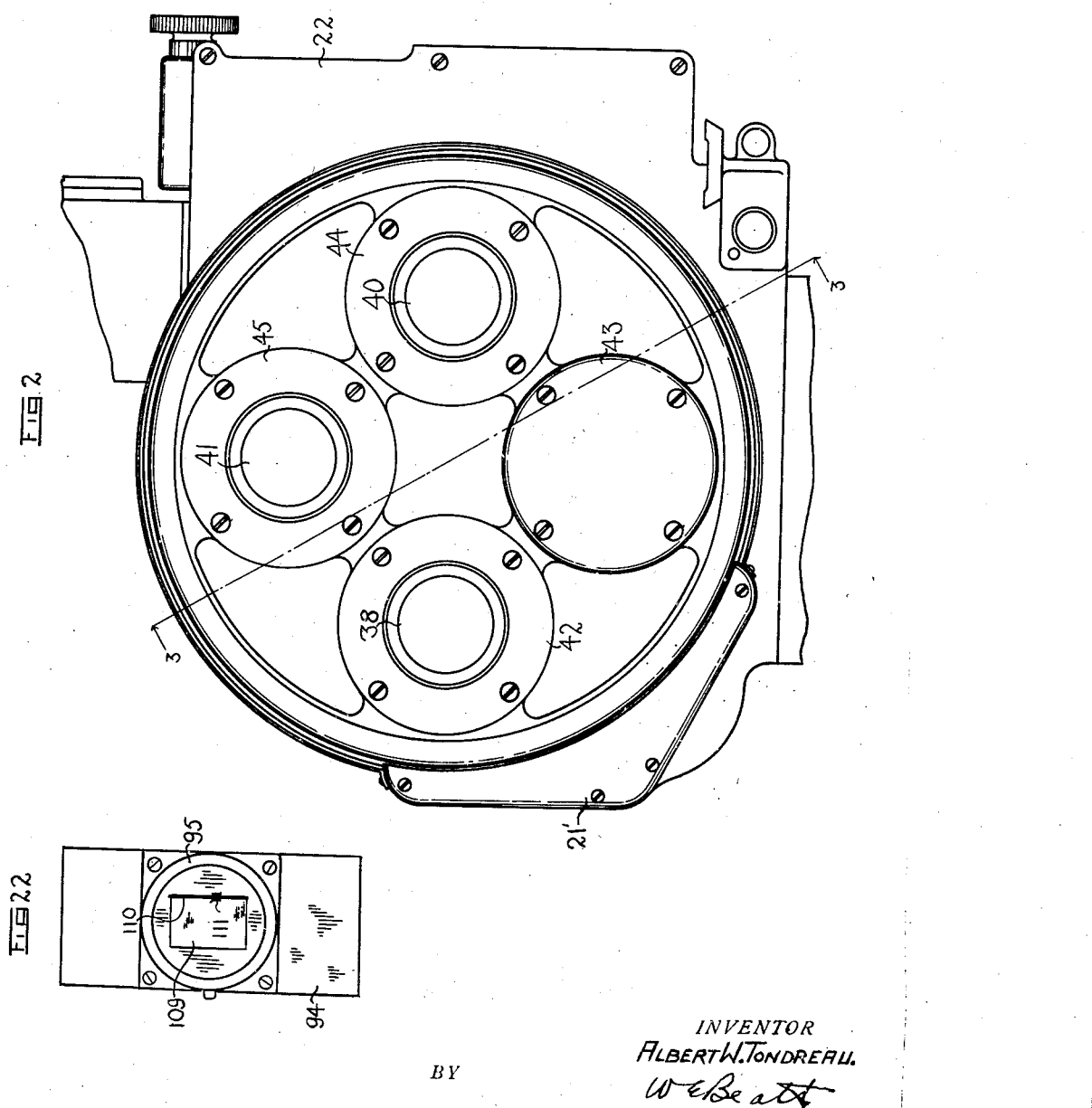

June 18, 1935.  A. W. TONDREAU  2,005,014
FOCUSING DEVICE FOR A MOTION PICTURE CAMERA
Filed April 19, 1932  7 Sheets-Sheet 3
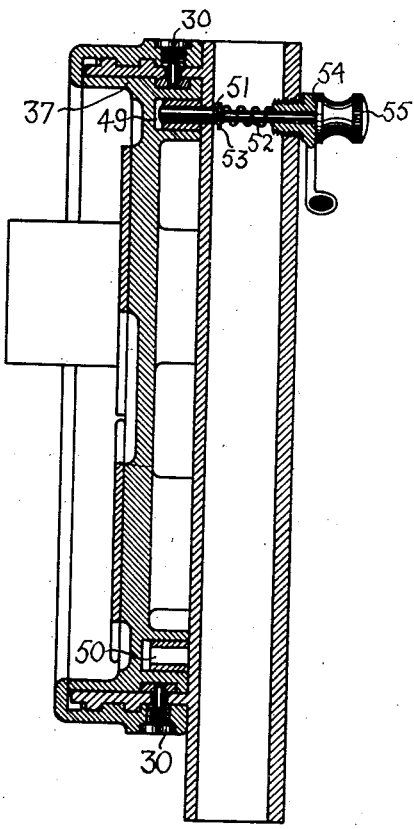
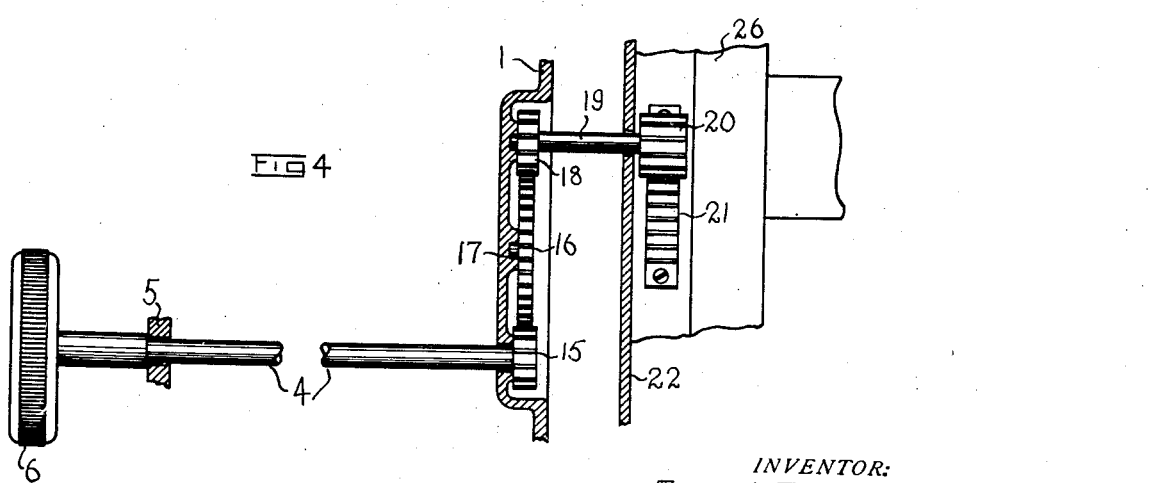
INVENTOR:
Albert W. Tondreau.
BY W. E. Beatty
ATTORNEY.

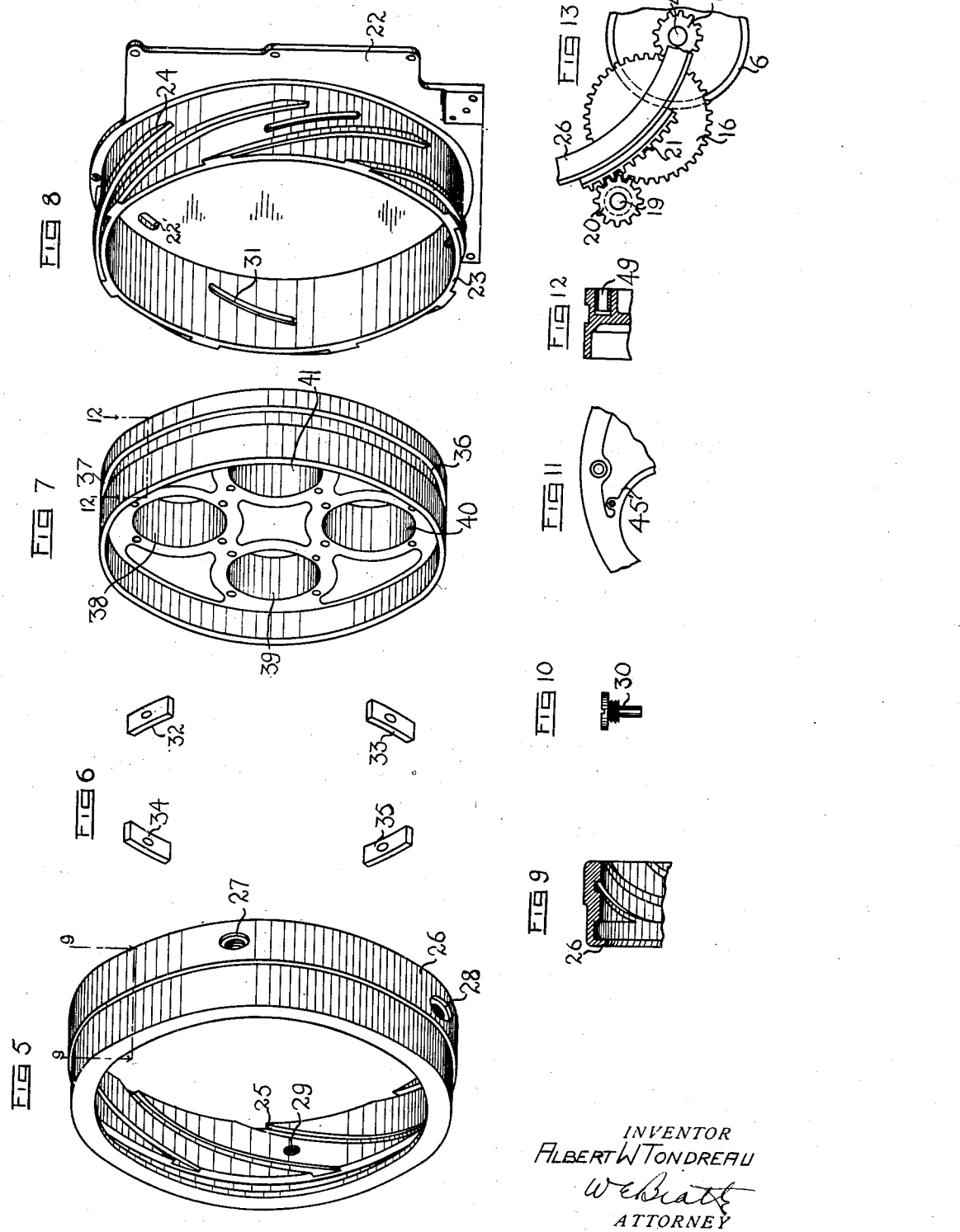
June 18, 1935.  A. W. TONDREAU  2,005,014
FOCUSING DEVICE FOR A MOTION PICTURE CAMERA
Filed April 19, 1932  7 Sheets-Sheet 4
INVENTOR
Albert W Tondreau
ATTORNEY

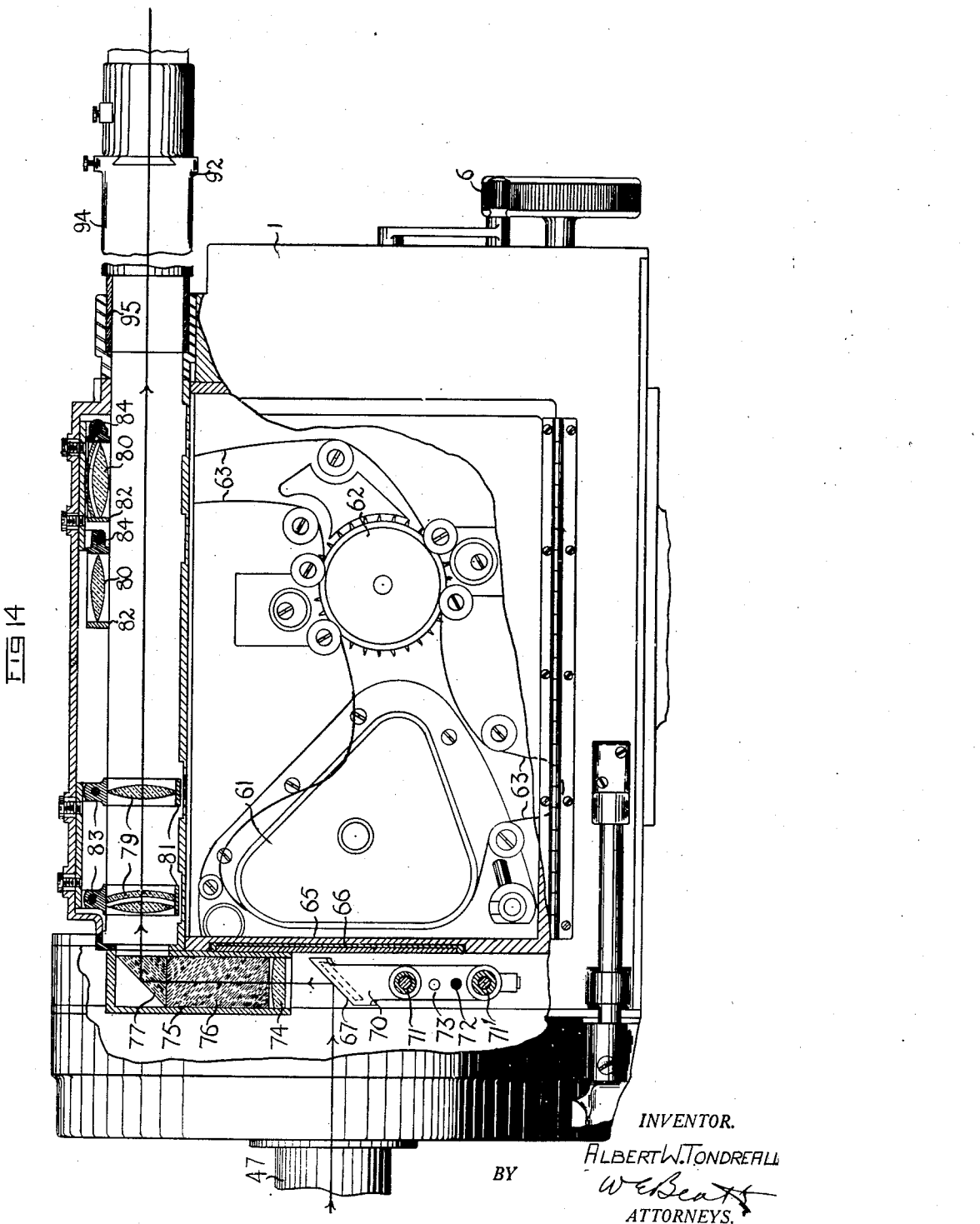

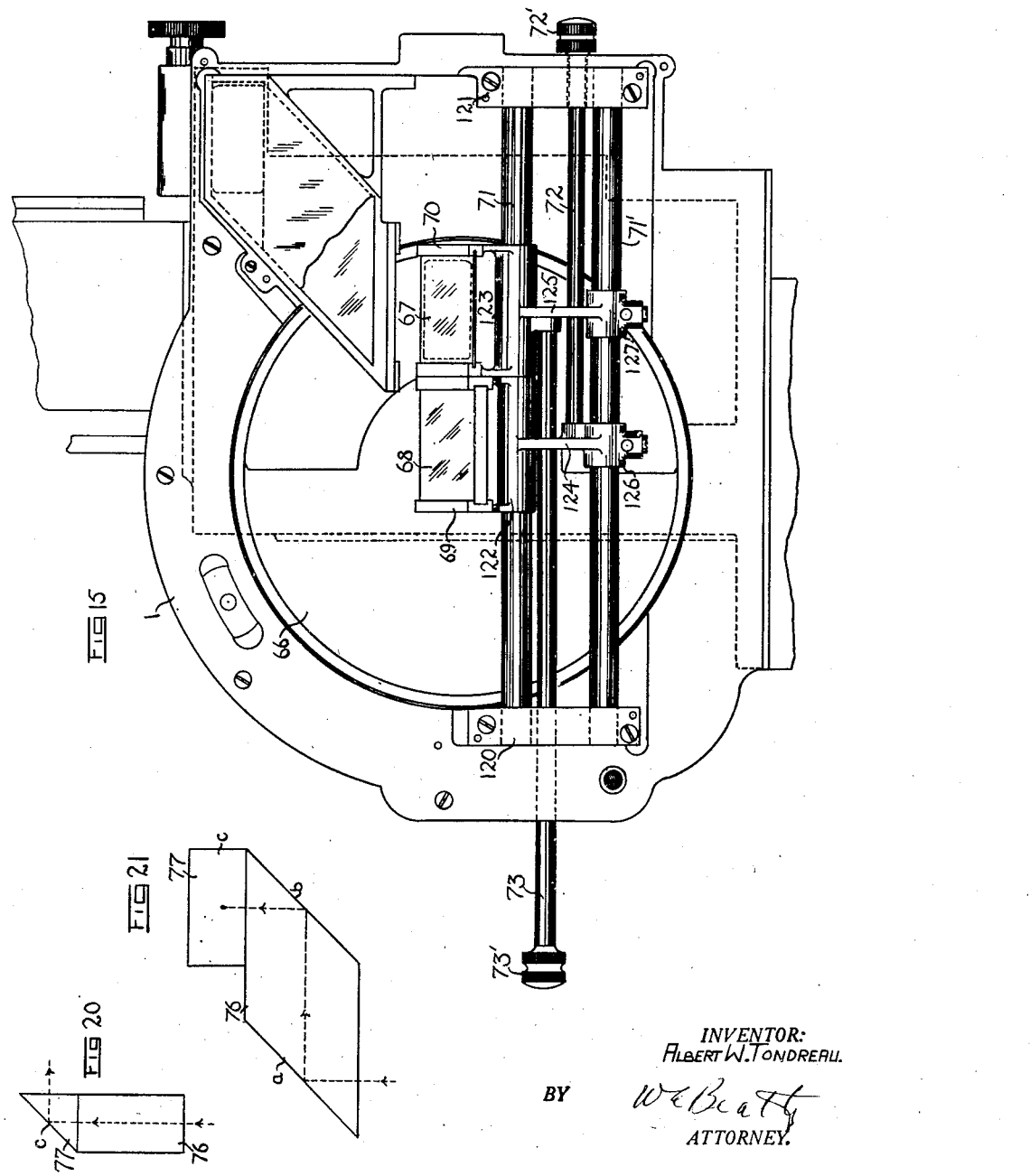

June 18, 1935. A. W. TONDREAU 2,005,014
FOCUSING DEVICE FOR A MOTION PICTURE CAMERA
Filed April 19, 1932  7 Sheets-Sheet 7
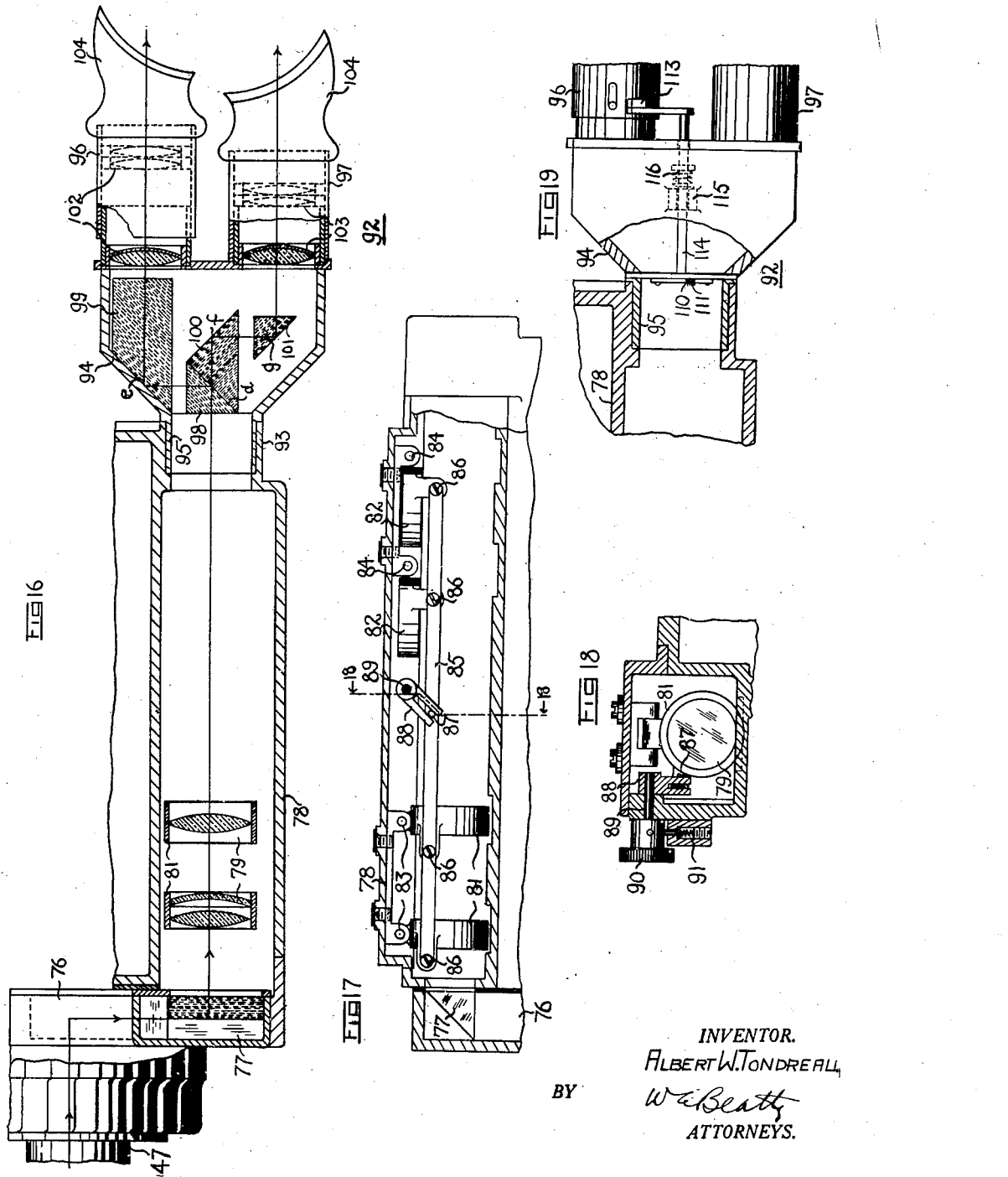
INVENTOR.
ALBERT W. TONDREAU
BY W. E. Beatty
ATTORNEYS.

Patented June 18, 1935

2,005,014

UNITED STATES PATENT OFFICE 2,005,014

FOCUSING DEVICE FOR A MOTION PICTURE CAMERA

Albert W. Tondreau, Hollywood, Calif., assignor to Warner Brothers Pictures, Inc., New York, N. Y., a corporation of Delaware Application April 19, 1932, Serial No. 606,084

4 Claims. (Cl. 95—45)

The invention relates to a focusing device for motion picture cameras, and particularly to an arrangement whereby a motion picture camera may be readily focused during the operation thereof and while observing the image being photographed on the film. This makes it possible for the operator to follow focus, i. e., to change the focus exactly in accordance with any variation in the distance between the camera and the scene being photographed.

This is accomplished by providing at the rear of the camera an eye-piece with a special optical system whereby the operator may, during operation of the camera, observe the image received by the film. Adjacent to this eye-piece is a focusing adjustment whereby the operator may conveniently change the focus while viewing, through the eye-piece, the image being photographed on the film.

It has heretofore been proposed to turn the selected objective lens on a lens turret in order to change the focus. This is objectionable, as the optical center of the lens usually does not coincide with its center of rotation, whereby the focused image does not remain stationary as it should when the focus is changed. This defect is overcome by the present invention, which provides an arrangement whereby the lens turret, together with the several lenses carried thereby, including the lens in front of the film gate, is reciprocated without being rotated, whereby the focused image does not ride or shift its position on the picture frame when the focus is changed.

For further details of the invention, reference may be made to the drawings, wherein Fig. 1 is a side elevation of a motion picture camera embodying means for focusing while viewing the scene being photographed.

Fig. 2 is a front elevation of the lens turret of this invention.

Fig. 3 is a cross-section, taken on the line 3—3 of Fig. 2.

Fig. 4 is a fragmentary view partly in cross-section of the gear train for operating the lens turret.

Figs. 5, 6, 7 and 8 are detailed perspective views of the assemblage of the lens turret of this invention.

Fig. 9 is a fragmentary view in cross-section, taken on the line 9—9 of Fig. 5.

Fig. 10 is a side elevation of a holding screw used in this invention.

Fig. 11 is a fragmentary view of a part of the cover plate shown in Fig. 2.

Fig. 12 is a fragmentary view in cross-section of a part of Fig. 7, taken on the line 12—12.

Fig. 13 is a schematic view of the arrangement of the gear train in Fig. 4.

Fig. 14 is a side elevation, partly in section, of the camera of this invention.

Fig. 15 is a front view of the reflector and prism system of this invention.

Fig. 16 is a plan view, in section, of the view-finder objective and binocular system of the invention.

Fig. 17 is a view in vertical, longitudinal section of the view-finder objective lens system.

Fig. 18 is a view in vertical transverse section on line 18—18 in Fig. 17.

Fig. 19 is a plan view, partly in section, of an automatic light shutter member for the view-finder in Fig. 16.

Figs. 20 and 21 are schematic views of the prism system for the view-finder.

Fig. 22 is an elevation of the automatic light shutter member in Fig. 19 with the shutter in closed position.

It is desirable in the taking of a "running shot" where a constant change of focus is required due to the camera moving up to the scene, or vice versa, that the camera operator may view the scene being photographed while the camera is in operation and as it actually appears in the photographing aperture of his camera, and at the same time so alter his focus that he will always obtain sharply denoted pictures on the negative film as the action advances or recedes. This is accomplished by the present invention, wherein the camera operator stands at the rear of a camera 1 (Fig. 1) and looks through a view-finder eye-piece 92 to view the scene being photographed while the camera is in operation, and at the same time manipulates the knob 6 to change the focus as required.

Details of the view-finder are disclosed and claimed in the co-pending application, Ser. No. 524,026, filed March 20, 1931, by Albert W. Tondreau.

The eye-piece 92, which may be either binocular or monocular, co-operates with a lens system (shown in detail in Figs. 16 and 17) and with the objective lens 47 supported by the lens turret 3 in front of the film gate of the camera (not shown).

In order that the camera operator may reciprocate the objective lens 47 and so alter the focus thereof at the same time that he is viewing the action being photographed, a knob 6 is conveniently located adjacent to the eye-piece 92, and knob 6, when rotated, reciprocates the lens through a shaft 4 supported by a bracket 5 and a gear train (Figs. 4 and 13) co-operating with the lens turret 3.

It is essential that the objective lens 47 be moved positively in a straight line in relation to the scene being photographed without rotating, so that any variation which there may be in the symmetry of the lens surface will not focus a distorted picture on the negative film. The mechanical details of how this is accomplished will be described hereinafter in connection with Figs. 5, 6, 7 and 8.

Referring to Fig. 1, an electric motor 2 is fastened by any suitable means to a side wall of the camera 1 and is used to drive the moving parts thereof, including mechanism (Fig. 14) for advancing the film. This film is supplied from a container (not shown). This container rests on top of the camera and is held in position by a positive lock 8 provided at the top of the camera 1. The lock 8 consists primarily of a stationary overlapping flange 9 and a movable overlapping flange 10 which are adapted to fit tightly over a collar projecting from the base of the film magazine. The flange 10 is fastened to rails adapted to slide in grooves cut in the camera top (not shown) and is moved longitudinally by turning a knob 11, fastened to one end of a shaft 12 and supported by an apertured bracket 13 depending from the flange 10. The other end of the shaft 12 is threaded and screws into a member 14 fastened to the camera wall.

The gear train above mentioned, for focusing the lens without turning it, consists of a pinion gear 15 (Figs. 4 and 13) fastened to the end of the shaft 4, and meshing with a gear 16 which is fastened to a stub shaft 17 journaled in the wall of the camera 1. Gear 16 meshes with a pinion gear 18, fastened to a shaft 19 supported at one end by a bearing in the front wall of camera 1 and at the other end by a bearing in the bracket 22 (Fig. 2). A gear 20 fastened to the end of shaft 19 meshes with an external rack 21 mounted on the wall of the slip ring 26 (Fig. 5) of the lens turret assembly 3. Rack 21 is sufficiently wide to allow the desired amount of reciprocal movement to be imparted to the ring 26. A cover plate 21' (Figs. 1 and 2) is attached to the fixed bracket 22 and protects the rack and gear train from outside contacts.

Referring to Figs. 5, 6, 7 and 8, the lens turret 3 before mentioned consists of a bracket 22 which has a film gate aperture (not shown) and suitable apertures 22' for fastening it to the front wall of the camera. Mounted on the bracket 22 and projecting therefrom is a fixed ring 23. The outer face of ring 23 has raised cam surfaces 24 which are cut to co-operate with recessed cam surfaces 25 in the inner face of a slip ring 26. The cams 24 are so cut that by rotating the ring 26 a helical motion is imparted thereto.

The outer slip ring 26 has four equally spaced apertures, of which 27, 28 and 29 are shown (Fig. 5), which are screw-threaded and counter-sunk to receive the projecting screws 30 (shown in Fig. 10). The projections on the screws 30 project through four equally spaced apertures 31 (Fig. 8) cut parallel with the raised cam surfaces 24 on the ring 23, and fit snugly in apertures cut in the centers of four substantially rectangular shoes 32, 33, 34 and 35 (Fig. 6). These shoes are shaped to ride in and fit flush with a recessed peripheral groove 36 cut in the outer face of a lens supporting ring 37 (Fig. 7). Ring 37 has four equally spaced apertures 38, 39, 40 and 41 cut in its face to accommodate the desired objective lens-holders. Cover plates like 43 may be used, in case one or more lenses are not in use, to cover the lens mounts such as 42, 44 and 45. A gasket 45' (as shown in Fig. 11) is inserted between the cover plates and the ring 37 to prevent incidental light from leaking into the camera.

Each lens-holder is provided with a small pilot aperture in ring 37, of which two apertures 49 and 50 are shown in Figs. 3 and 12. Each aperture is adapted to receive, in one position where the desired lens is in front of the film gate, a spring pressed detent 51, in order to prevent the ring 37 from rotary movement and yet at the same time to permit reciprocal movement thereof. The detent 51 is urged forward by a spring 52 pressing at one end upon a collar 53 surrounding the detent 51, and at the other end upon the face of a bearing housing 54. The housing 54 is screwed into a wall of the camera 1 and supports the shaft of the detent 51. A knob 55 fastened to the end of the detent 51 presses against the bearing housing 54 and arrests the forward movement of the detent 51. As shown in Fig. 1 the knob 55 is mounted at the back of the lens turret 3, the back face of the lens turret 3 being larger in diameter than the camera casing at this point. When the knob 55 is pulled out it withdraws the detent 51 from the aperture 49 adjacent to the lens-holder (Fig. 3) and permits the ring 37 to be rotated until the desired lens is brought into place in front of the film gate, where the knob is released, allowing the detent 51 to again enter the aperture adjacent to the lens, and so prevent the ring from rotating.

Thus it will be seen that the operator, while viewing the scene being photographed, may turn the knob 6 which sets the gear train in motion and imparts a helical motion to the ring 26 through the cam surface 24. This motion is transformed into longitudinal motion of the lens supporting ring 37 by means of the screws 30, the sliding shoes 32, 33, 34 and 35 and the spring pressed detent 51.

Referring to Fig. 14, the camera 1, intermittent motion 61 and feed sprocket system 62 traverse a film 63 in photographic relationship to an objective lens 47, the picture being made on the film behind the picture gate 65. The camera includes suitable film reels, shutter, tripod-head, film advancing mechanism, etc., as will be understood.

Between the objective 47 and the picture gate 65, preferably in front of the shutter system 66, is positioned a pair of mirrors 67 and 68 carried in frames 69 and 70. These frames 69 and 70 are supported by two apertured slides 122 and 123 which slide on the cross-rail 71. Depending from these primary slides are brackets 124 and 125, respectively, the lower extremities of which form apertured slides 126 and 127 that slide on the rail 71'. These rails 71 and 71' are fastened at either end in similar brackets 120 and 121 mounted on the frame 1 of the motion picture camera. A pull rod 72 and knob assembly 72' are attached to the frame 69, and another pull rod 73 and knob assembly 73' are attached to the frame 70. As shown, these pull rods 72 and 73 are positioned between the carrier rods 71 and 71' and fastened to the brackets 124 and 125, respectively. Their ends project out of opposite sides of the camera 1 where the knobs 72' and 73' are conveniently accessible to the camera operator.

The mirror 67 is a "half-silvered mirror", or partially silvered, of the type readily made by such processes as cathode sputtering or by brief immersion in a slow acting silvering solution. This mirror may desirably reflect about thirty-five per cent (35%) of the incident light and pass about sixty per cent (60%), the remaining portion being absorption loss. This ratio may, however, be modified according to the user's skill in focusing, the light intensity under which the camera is most commonly used and the size of lens aperture used. The mirror 68 is desirably a totally reflecting mirror, either silver on glass or plated and polished metal such as a film of chromium or lacquered silver upon a sheet metal foundation.

The mirrors 67 and 68 are adapted to be separately drawn over or away from the picture gate 65, sliding upon the rods 71 and 71' and pulled by the rods 72 and 73.

A plano-convex lens 74 is provided and mounted in a frame 75 in a position above the picture gate 65 and above the mirrors 67 and 68. The plane side of the lens 74 is faced toward the mirrors and is ground, or otherwise treated, to form a focusing screen. It is so positioned that the distance from the optical center of the objective lens 47 by way of the mirrors 67 and 68 to the screen surface is exactly equal to the distance from the optical center of the lens 47 to the film surface behind the picture gate 65. By this construction it is insured that an image which is sharply focused upon the screen surface of the lens 74 will also be sharply focused upon the film behind the gate 65. It is, of course, essential that the mirrors 67 and 68 be so constructed and mounted in the frames 69 and 70 that they will each fall in corresponding positions, so that rays of light of a given object when focused upon the focusing screen surface of the lens 74 by reflection from the mirror will be in equally sharp focus upon the film in the film gate 65. Also, the position of the mirror 67 may desirably be adjusted to compensate for the thickness of the glass therein, when it is in position, although the optical effect of the thickness of the glass may be made negligible by using sufficiently thin glass.

Above the lens 74 and within the frame 75 is positioned a prism system 76, shown in further detail in Figs. 20 and 21. This prism system is adapted to cause total reflection at the face $a$ of the light passing through the lens 74, deflecting the rays of light into a horizontal position, as shown in Fig. 21. Total reflection again occurs at the face $b$ to direct the rays of light upward again in a line parallel to the original upward line, but displaced sideways by a substantial amount. An auxiliary prism 77 produces total reflection at the face $c$ and directs the rays of light toward the back of the camera. By this prism system light from the objective 47 is directed towards the back of the camera at a point above and to the side of the picture gate and feeding mechanism.

In line with the face of the prism 77 is provided a lens tube 78 within which are positioned two sets of auxiliary view-finder objective lenses 79 and 80. The respective lens components of the systems 79 and 80 are mounted in pairs of thimbles, or rings, 81 and 82, pivoted within the lens tube 78. The thimbles 81 are pivoted upon appropriate pivot members 83, as shown in Fig. 17, and the thimbles 82 are similarly pivoted in another portion of the lens tube 78 upon the pivot members 84. The respective pairs of thimbles 81 and 82 are connected by a rod 85 (Fig. 17) pivoted thereto upon screws 86, as shown, and having a pin 87 co-operating with a crank member 88. The member 88 is mounted upon a shaft 89 (Figs. 17 and 18), passing through the lens tube body 78 and having a thumb nut 90 upon the outer end. The thumb nut 90 is desirably equipped with a detent or "click" 91. The length of the rod 85 is so adjusted that when the lenses 79 are thrown into the lens tube 78 and into the line of light from the prism 77, the lenses 80 are drawn upward out of the light path, and conversely, when the lenses 80 are thrown into the light path, the lenses 79 are thrown out of the way. The lenses 79 and 80 serve alternatively as objective lenses in co-operation with the ground face of the lens 74 to project an image toward an eye-piece attached to the end of the lens tube 78. At the rear end of the lens tube 78 is provided an eye-piece system 92, which may desirably be attached thereto by a joint 93 with the lens tube.

The eye-piece system 92 (Fig. 16) is desirably a binocular system, although a monocular eye-piece may be used if desired. The binocular eye-piece system may consist of a bifurcated body member 94 having a tubular portion 95 co-operating with the lens tube 78 and a pair of eye tubes 96 and 97. Within the body member 94 is mounted a right-angled prism 98 having a half-silvered surface $d$. Co-operating with a side face of the prism 98, as shown, is a second prism 99, also mounted within the member 94 and adapted for total reflection at the face $e$. A third prism 100 is provided co-operating with the half-silvered face of the prism 98 and adapted to produce total reflection at the face $f$. A fourth prism 101 is provided, adapted to total reflection at the face $g$ and co-operating with the side of the prism 100. By this system the light beam from the lens systems 79 and 80 is split at the face $d$ and a portion reflected to the right into the prism 99 and rearward through it. The remaining portion of the light is then transmitted to the prism 100 and reflected by it to the left into the prism 101 and by it also rearwardly. Eye-piece lenses 102 and 103 are provided respectively co-operating with the prisms 99 and 101, and appropriate eye-guard members 104 are provided mounted upon tube members 96—97 co-operating with the frame member 94, as shown.

The eye lenses 102 and 103 thus co-operate through the prism system with the lenses 79 and 80 to provide an enlarged and brilliant image of the light focused upon the ground surface of the lens 74.

The view-finder lens system provides an open optical light path between the sensitive film and the eye lens, through which light may pass, to fog the film if the lenses are not covered, as by the operator's head and eyes, or other means. Accordingly, means are provided to close this light path when the view-finder system is not in use. This device may be a simple flap shutter inserted in the lens tube 78 at a convenient point, with a knob or handle extending to the outside to enable the operator to open or close the shutter at will, and to open the shutter when he desires to examine the field. Alternatively, an automatic shutter may be provided, as shown in Figs. 19 and 22. In this shutter member one or both of the eye tubes 96 and 97 may be slidably mounted. The shutter 109 is then mounted upon an axis 110 within and at the rear end of the tube 95, with a spring 111 holding it closed. A stop member 113 is provided upon the slidable sleeve 96 of the eye-piece, and a push rod 114 co-operates between the stop 113 and the shutter member 109, sliding in a guide 115 under the control of a spring 116.

In operation, the respective springs 111 and 116 keep the shutter 109 closed until the operator presses his face against the eye-piece members, which procedure opens the shutter 109 in an obvious manner.

In the operation of the focusing device of this invention, light from the subject being photographed is collected by the objective lens 47 and focused within the camera. With the mirror 68 positioned between lens 47 and the picture gate 65 all of the light from the objective 47 is reflected upward upon the ground screen surface of the lens 74, through the prisms 76 and 77, the lens systems 79 and 80 and the eye-piece lens 102 and 103. The lens system, comprising the lens 79 and the eye-piece lenses 102 and 103, is preferably prefocused, as upon cross-hairs or other suitable mark upon the ground screen surface of the lens 74. The objective lens 47 may then be adjusted to bring the scene to be photographed into sharp focus upon the ground screen face of the lens 74, and the accuracy of focus checked by the secondary optical system of the view-finder. If the operator wishes to examine the whole of the picture area, he may position the lens system 80 in operating position within the lens tube 78, whereupon he will have a small amount of enlargement of the image upon the ground face of the lens 74 through the eye lenses 102 and 103. If, however, he wishes to check the focus with greater accuracy, the lens system 79 may be brought into operating position within the lens tube 78, whereupon a much higher magnification is secured and an accurate focus may be very much more easily secured. The mirror 68 may then be withdrawn from between the objective lens 47 and the picture gate 65, whereupon photographing may be proceeded with in the usual way.

Alternatively, if the operator wishes, he may proceed with the photographing and still view the image for focus, position, etc. For this operation, the half-silvered mirror 67 may be moved into position between the objective 47 and the picture gate 65 by the rod 72. A portion of the light from the objective lens 47 is then reflected upward by the mirror 67 and brought to a focus upon the ground screen surface of the lens 74, and the remainder passes through the mirror 67 and is brought to a focus upon the film behind the picture gate 65. The portion of light passing through the mirror and incident upon the film is sufficient for an adequate exposure under normal light conditions. Likewise, under the same conditions, the amount of light thrown upon the ground screen face of the lens 74 and transferred from it to the eye lenses 102 and 103 is sufficient for the operator to verify the correctness of focus and to watch the play of scenes before the objective lens. As before, either of the auxiliary lenses 79 or 80 may be utilized, depending upon the degree of magnification in the view-finder as desired by the operator.

By the system of this invention, it is thus possible during operation of the camera to focus the image from the objective lens upon the film by inspection of an image, which may be magnified according to the user's desires.

For such focusing, the device further permits the operator to view the image with both eyes from the rear of the camera, thereby obtaining the advantages inherent in binocular vision and the accompanying sureness, speed and accuracy of focusing. The operator may focus roughly at a low magnification for more accurate focusing. The focusing may be done without exposing the film, by the aid of a totally reflecting mirror which throws all of the light into the focusing lens system; or the focusing may be done during the time the camera is exposing film by the use of the half-silvered mirror. In addition, the outlines of the field of view may be adjusted upon the desired objects while film is being exposed, as during the taking of panoramic pictures, or during such operations as moving the camera to or from the subject, to expand or retract the field of view, and the accuracy of focus may be sharply maintained during such operations as well. Furthermore, this focusing may be accomplished while the camera is in operation and without rotating the particular turret lens which is in front of the film gate.

While there is here disclosed but a single embodiment of this invention, other modifications thereof may be made without departure from the inventive concept covered by the following claims.

I claim:

1. A motion picture camera, comprising a lens holder having a plurality of lens apertures circularly arranged therein, said holder having a peripheral groove, a stationary ring fixed to the casing of said camera and surrounding said lens holder, the exterior surface of said stationary ring being provided with a cam surface, a movable ring having a co-operating cam surface and surrounding said stationary ring, a shoe fixed to said movable ring and adapted to ride in said groove in said lens holder, said stationary ring having a slot through which said shoe extends, means for locking any one of the lens apertures in photographing position for permitting longitudinal movement thereof while preventing rotation thereof, and means for rotating said movable cam ring.

2. A lens turret for a motion picture camera comprising a lens ring, a circular array of lens tubes in said ring, a locking aperture at the back of said ring for each of said lens tubes, said lens ring having a circumferential groove, stationary and movable cam rings concentric with said lens ring, said cam rings having cooperating cam surfaces integral therewith respectively, said movable cam ring having a shoe extending into said circumferential groove, and a locking pin at the back of said lens ring and adapted to engage a selected one of said locking apertures, to prevent rotation of said lens ring and to permit axial movement thereof consequent upon rotation of said movable cam ring.

3. A lens turret for a motion picture camera comprising a lens ring, a circular array of lens tubes in said ring, a locking aperture at the back of said ring for each of said lens tubes, said lens ring having a circumferential groove, stationary and movable cam rings concentric with said lens ring, said cam rings having cooperating cam surfaces integral therewith respectively, said movable cam ring having a shoe extending into said circumferential groove, a locking pin at the back of said lens ring and adapted to engage a selected one of said locking apertures, to prevent rotation of said lens ring and to permit axial movement thereof consequent upon rotation of said movable cam ring, a rack on said movable ring, a pinion engaging said rack, a shaft fixed to said pinion and extending at one side of the camera parallel to the axis of said rings, and a handle at the back of the camera for turning said shaft.

4. A motion picture camera, comprising a lens holder having a plurality of lens apertures circularly arranged therein, said holder having a peripheral groove, a stationary ring fixed to the casing of said camera and surrounding said lens holder, the exterior surface of said stationary ring having integral therewith a plurality of cam surfaces, a movable ring having integral therewith a plurality of cam surfaces cooperating with the cam surfaces on said stationary ring, a plurality of shoes fixed to said movable ring and adapted to ride in said groove in said lens holder, a locking aperture for each of said lens apertures at the back of said lens holder, a locking pin adapted to engage a selected one of said apertures, and means for rotating said movable cam ring.

ALBERT W. TONDREAU.